US006962752B2

(12) United States Patent
Fukuda et al.

(10) Patent No.: US 6,962,752 B2
(45) **Date of Patent: *Nov. 8, 2005**

(54) CURABLE COMPOSITION FOR FORMING LOW BLEEDING GEL TYPE CURED PRODUCT

(75) Inventors: Kenichi Fukuda, Gunma-ken (JP); Mikio Shiono, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 145 days.

This patent is subject to a terminal disclaimer.

(21) Appl. No.: 10/338,706

(22) Filed: Jan. 9, 2003

(65) Prior Publication Data

US 2003/0162038 A1 Aug. 28, 2003

(30) Foreign Application Priority Data

Jan. 10, 2002 (JP) ....................................... 2002-003924

(51) Int. Cl.[7] ......................... B32B 27/04; C08L 83/05; C08L 101/04

(52) U.S. Cl. ....................... 428/422; 428/421; 428/447; 524/858; 524/860; 524/861; 524/862; 528/15; 528/25; 528/28; 528/31; 528/32; 528/33; 528/34; 528/35; 528/36; 528/42; 528/43; 528/401

(58) Field of Search .............................. 528/15, 25, 28, 528/31, 32, 33, 34, 36, 42, 43, 401; 525/25, 478, 479; 524/261, 267, 858, 860, 861, 862; 428/421, 422, 447

(56) References Cited

U.S. PATENT DOCUMENTS

| | | | | |
|---|---|---|---|---|
| 4,085,137 A | | 4/1978 | Mitsch et al. | |
| 4,094,911 A | | 6/1978 | Mitsch et al. | |
| 6,040,400 A | | 3/2000 | Fukuda et al. | |
| 6,127,504 A | | 10/2000 | Fukuda et al. | |
| 6,414,062 B1 | * | 7/2002 | Fukuda et al. | 524/267 |
| 6,828,360 B2 | * | 12/2004 | Fukuda et al. | 523/212 |
| 6,844,632 B2 | * | 1/2005 | Shiono et al. | 257/788 |

FOREIGN PATENT DOCUMENTS

| | | |
|---|---|---|
| EP | 0 926 182 | 6/1999 |
| EP | 0 967 251 | 12/1999 |
| EP | 1 081 192 | 3/2001 |

* cited by examiner

*Primary Examiner*—Michael J. Feely
(74) *Attorney, Agent, or Firm*—Millen, White, Zelano & Branigan, P.C.

(57) ABSTRACT

A curable composition comprising:

(A) a branched polyfluorodialkenyl compound represented by a general formula (1):

$$CH_2{=}CH{-}(X)_a{-}Rf^1{-}(X')_a{-}CH{=}CH_2 \quad (1)$$

wherein, X and X' are bivalent groups such as $-CH_2-$ and $-CH_2O-$, a represents, independently, either 0 or 1, and $Rf^1$ is a specific bivalent fluorine-containing group, (B) a branched polyfluoromonoalkenyl compound represented by a general formula (2):

$$Rf^2{-}(X')_a{-}CH{=}CH_2 \quad (2)$$

wherein, X' and a are as defined above, and $Rf^2$ is a specific fluorine-containing group, (C) an organohydrogensiloxane compound with at least two hydrogen atoms bonded to silicon atoms, and (D) a platinum group metal catalyst; as well as a low bleeding gel type cured product obtained by curing such a composition, and an electrical or electronic component sealed or encapsulated using such a cured product. The gel type cured product displays very little bleeding of free oil constituents from the gel as a result of stress such as pressure fluctuation or heat history.

19 Claims, No Drawings

CURABLE COMPOSITION FOR FORMING LOW BLEEDING GEL TYPE CURED PRODUCT

BACKGROUND OF THE INVENTION

1. Field of the Invention

The present invention relates to an addition curing type fluorine-containing curable composition which forms a gel type cured product from which bleeding is extremely limited and which displays excellent chemical resistance and solvent resistance following curing, and which is ideally suited for applications such as potting materials, sealing or encapsulating materials and coating materials used with electrical or electronic components.

2. Description of the Prior Art

Gel type cured products of silicone rubbers offer superior electrical and thermal insulation and display stable electrical characteristics and flexibility, and are consequently widely used as the potting and sealing or encapsulating materials for electrical and electronic components, and as coating materials for protecting control circuit elements such as power transistors, ICs and condensers from external thermal or mechanical faults.

A representative example of a silicone rubber composition for forming this type of gel type cured product is an addition curing type organopolysiloxane composition. This type of addition curing type organopolysiloxane composition comprises, for example, an organopolysiloxane with vinyl groups bonded to silicon atoms, and an organohydrogenpolysiloxane with hydrogen atoms bonded to silicon atoms, and yields a silicone gel through a cross-linking reaction in the presence of a platinum-based catalyst (refer to Japanese Laid-open publication (kokai) No. 56-143241 (JP56-143241A), No. 62-3959 (JP62-3959A), No. 63-35655 (JP63-35655A) and No. 63-33475 (JP63-33475A)).

Furthermore, fluorosilicone gel compositions comprising an organopolysiloxane with trifluoropropyl groups are also known (refer to Japanese Laid-open publication (kokai) No. 7-324165 (JP7-324165A)).

However, the silicone gels obtained from these types of addition curing type organopolysiloxane compositions are susceptible to swelling and degradation by chemicals such as strong bases and strong acids, as well as solvents such as toluene, alcohol and gasoline, and maintaining the performance of the gels has proven difficult.

In order to resolve this problem, a fluorine-containing gel composition comprising a linear compound having a bivalent perfluoropolyether group in its backbone chain and having two alkenyl groups per molecule as a main constituent, and also comprising an organohydrogenpolysiloxane with hydrogen atoms bonded to silicon atoms, and a platinum-based catalyst, together with a fluorine-containing gel type cured product produced from such a composition, have been proposed (refer to Japanese Laid-open publication (kokai) No. 11-116685 (JP11-116685A)).

However, when a gel of this description is used as a protective material, stress such as pressure fluctuation, and heat history cause a free oil component to bleed from the gel, resulting in contamination of the electrical or electronic component. This contamination can cause the electrical or electronic component to either exhibit substandard performance or even fail to operate. Furthermore following curing of the gel, in cases where additional materials are then used, the gel can cause deterioration in the adhesion and leakage. Accordingly, a gel composition with only a very small bleeding component, but which produces a gel type cured product, has been keenly sought.

SUMMARY OF THE INVENTION

An object of the present invention is to provide a curable composition which is capable of forming a flexible gel type cured product, and yet displays very little bleeding of free oil constituents from the gel as a result of stress such as pressure fluctuation or heat history.

A first aspect of the present invention provides a curable composition comprising:

(A) a branched polyfluorodialkenyl compound represented by a general formula (1) shown below:

$$CH_2{=}CH{-}(X)_a{-}Rf^1{-}(X')_a{-}CH{=}CH_2 \quad (1)$$

wherein, X is a bivalent group represented by $-CH_2-$, $-CH_2O-$, $-CH_2OCH_2-$ or $-Y-NR^1-CO-$ (wherein, Y is a bivalent group represented by $-CH_2-$ or a formula shown below,

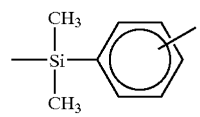

and $R^1$ is either a hydrogen atom, or a substituted or unsubstituted monovalent hydrocarbon group), X' is a bivalent group represented by $-CH_2-$, $-OCH_2-$, $-CH_2OCH_2-$ or $-CO-NR^1-Y'-$ (wherein, Y' is a bivalent group represented by $-CH_2-$ or a formula shown below,

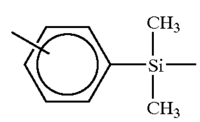

and $R^1$ is as defined above), a represents, independently, either 0 or 1, and $Rf^1$ is a bivalent group represented by any one of a general formula (i) shown below $$-CF(CF_3)-[OCF_2CF(CF_3)]_p-[O-CF_2(CF_2)_rCF_2-O]-[CF(CF_3)CF_2O]_q-CF(CF_3)- \quad (i)$$

(wherein, p and q represent integers of 1 or greater and the average of the sum of p and q is within a range from 2 to 200, and r represents an integer from 0 to 6), a general formula (ii) shown below $$-CF_2CF_2-[OCF_2CF(CF_3)]_p-[O-CF_2(CF_2)_rCF_2-O]-[CF(CF_3)CF_2O]_q-CF_2CF_2- \quad (ii)$$

(wherein, s and t represent integers of 1 or greater and the average of the sum of s and t is within a range from 2 to 200, and r is as defined above), and a general formula (iii) shown below $$\text{—}CF(CF_3)\text{—}[OCF(CF_3)CF_2]_u\text{—}(OCF_2)_v\text{—}OCF(CF_3)\text{—} \quad \text{(iii)}$$

(wherein, u represents an integer from 1 to 200, and v represents an integer from 1 to 50);

(B) a branched polyfluoromonoalkenyl compound represented by a general formula (2) shown below:

$$Rf^2\text{-}(X')_a\text{—}CH{=}CH_2 \quad (2)$$

$Rf^2$ is a group represented by either a general formula (iv) shown below $$F\text{—}[CF(CF_3)CF_2O]_w\text{—}CF(CF_3)\text{—} \quad \text{(iv)}$$

(wherein, w represents an integer of 1 or greater, which is smaller than the sum of r and the average value of p+q, smaller than the sum of r and the average value of s+t, and smaller than the sum of u and v, according to the definitions for the group $Rf^1$ of the aforementioned constituent (A)), or a general formula (v) shown below $$F\text{—}[CF(CF_3)CF_2O]_x\text{—}CF(CF_3)CF_2OCF_2CF_2\text{—} \quad \text{(v)}$$

(wherein, x represents an integer of 1 or greater, which is smaller than the sum of r and the average value of p+q, smaller than the sum of r and the average value of s+t, and smaller than the sum of u and v, according to the definitions for the group $Rf^1$ of the aforementioned constituent (A));

(C) an organohydrogensiloxane compound with at least two hydrogen atoms bonded to silicon atoms within a single molecule; and (D) an effective quantity of a platinum group metal catalyst.

A second aspect of the present invention provides a low bleeding gel type cured product with a penetration from 1 to 200, obtained by curing the composition described above.

In addition, a third aspect of the present invention provides an electrical or electronic component sealed or encapsulated with the low bleeding gel type cured product described above.

DETAILED DESCRIPTION OF THE PREFERRED EMBODIMENTS

As follows is a more detailed description of the present invention.

[Curable Composition]

[Constituent (A)]

The branched polyfluorodialkenyl compound of the constituent (A) of the present invention is represented by a general formula (1) shown below:

$$CH_2{=}CH\text{—}(X)_a\text{-}Rf^1\text{-}(X')_a\text{—}CH{=}CH_2 \quad (1)$$

wherein, X, X', $Rf^1$ and a are as defined above.

The $R^1$ of the groups X and X' is a hydrogen atom, or a monovalent hydrocarbon group of 1 to 12, and preferably 1 to 10 carbon atoms. Specific examples of suitable groups include alkyl groups such as methyl groups, ethyl groups, propyl groups, butyl groups, hexyl groups, cyclohexyl groups and octyl groups; aryl groups such as phenyl groups and tolyl groups; aralkyl groups such as benzyl groups and phenylethyl groups; as well as substituted monovalent hydrocarbon groups in which either a portion, or all of the hydrogen atoms in the above groups are substituted with a halogen atom such as fluorine.

As described above, the $Rf^1$ group is a bivalent group represented by any of the general formulas (i), (ii) or (iii) shown below.

$$\text{—}CF(CF_3)\text{—}[OCF_2CF(CF_3)]_p\text{—}[O\text{—}CF_2(CF_2)_rCF_2\text{—}O]\text{—}[CF(CF_3)CF_2O]_q\text{—}CF(CF_3)\text{—} \quad \text{(i)}$$

wherein, p, q and r are as defined above, $$\text{—}CF_2CF_2\text{—}[OCF_2CF(CF_3)]_s\text{—}[O\text{—}CF_2(CF_2)_rCF_2\text{—}O]\text{—}[CF(CF_3)CF_2O]_t\text{—}CF_2CF_2\text{—} \quad \text{(ii)}$$

wherein, s, t and r are as defined above, and $$\text{—}CF(CF_3)\text{—}[OCF(CF_3)CF_2]_u\text{—}(OCF_2)_v\text{—}OCF(CF_3)\text{—} \quad \text{(iii)}$$

wherein, u, and v are as defined above.

Specific examples of the $Rf^1$ group include those shown below. A bivalent group with a structure represented by the first formula below is particularly preferred.

$$\text{—}\underset{CF_3}{\underset{|}{CF}}\text{—}\left(OCF_2\text{—}\underset{CF_3}{\underset{|}{CF}}\right)_m\text{—}O\text{—}(CF_2)_2\text{—}O\text{—}\left(\underset{CF_3}{\underset{|}{CF}}\text{—}CF_2O\right)_n\text{—}\underset{CF_3}{\underset{|}{CF}}\text{—}$$

wherein, m and n represent integers of 1 or greater, although the average value of m+n=2 to 200.

$$\text{—}CF_2CF_2OCF_2\text{—}\underset{CF_3}{\underset{|}{CF}}\text{—}\left(OCF_2\text{—}\underset{CF_3}{\underset{|}{CF}}\right)_m\text{—}O\text{—}(CF_2)_2\text{—}O\text{—}\left(\underset{CF_3}{\underset{|}{CF}}\text{—}CF_2O\right)_n\text{—}\underset{CF_3}{\underset{|}{CF}}\text{—}CF_2OCF_2CF_2\text{—}$$

wherein, m and n represent integers of 1 or greater, although the average value of m+n=2 to 200.

$$\text{—}\underset{CF_3}{\underset{|}{CF}}\text{—}\left(\underset{CF_3}{\underset{|}{OCF}}\text{—}CF_2\right)_m\text{—}(OCF_2)_n\text{—}O\text{—}\underset{CF_3}{\underset{|}{CF}}\text{—}$$

wherein, m represent an integer from 1 to 200 and n represents an integer from 1 to 50.

Specific examples of the polyfluorodialkenyl compound represented by the general formula (1) include those compounds shown below.

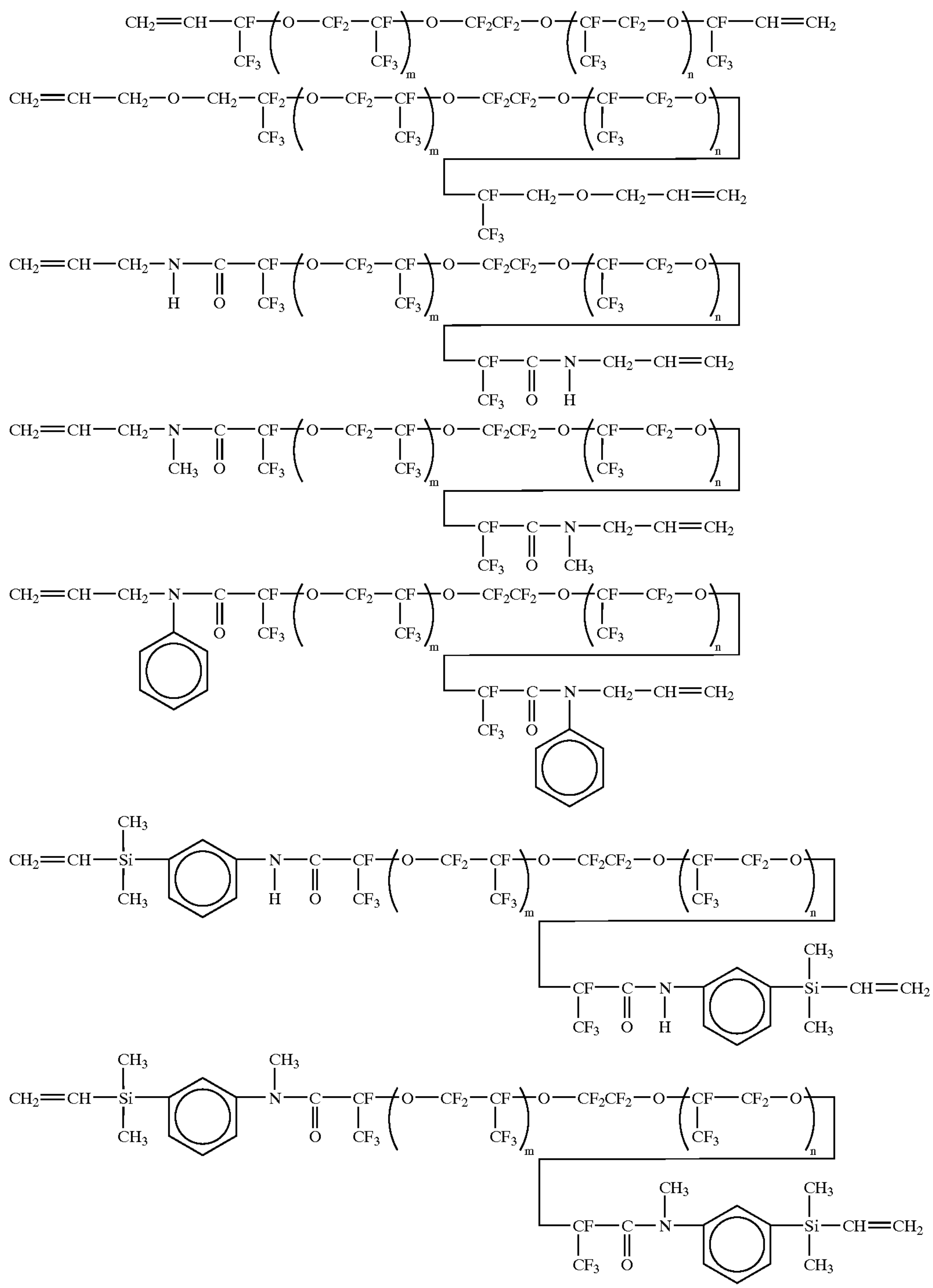

wherein, m and n represent integers of 1 or greater, although the average value of m+n=2 to 200.

The viscosity (23° C.) of the constituent (A) should preferably be within a range from 5 to 100,000 mPa·s, as a viscosity within this range provides the composition with appropriate physical characteristics for injecting, potting, coating, immersion and adhesion, and is ideal for curing. The most suitable specific viscosity can then be selected from within the above viscosity range, in accordance with the intended use for the composition.

[Constituent (B)]

A branched polyfluoromonoalkenyl compound of the constituent (B) of the present invention is represented by a general formula (2) shown below:

$$Rf^2\text{-}(X')_a\text{—}CH\text{═}CH_2 \qquad (2)$$

wherein, X', $Rf^2$ and a are as defined above.

As described above, the $Rf^2$ group is a group represented by either of the general formulas (iv) and (v) shown below.

$$F\text{—}[CF(CF_3)CF_2O]_w\text{—}CF(CF_3)\text{—} \qquad (iv)$$

wherein, w represents an integer of 1 or greater, which is smaller than the sum of r and the average value of p+q, smaller than the sum of r and the average value of s+t, and smaller than the sum of u and v, according to the definitions for the group $Rf^1$ of the aforementioned constituent (A).

$$F{-}[CF(CF_3)CF_2O]_x{-}CF(CF_3)CF_2OCF_2CF_2{-} \quad (v)$$

wherein, x represents an integer of 1 or greater, which is smaller than the sum of r and the average value of p+q, smaller than the sum of r and the average value of s+t, and smaller than the sum of u and v, according to the definitions for the group $Rf^1$ of the aforementioned constituent (A).

The restrictions on the values of w and x of the $Rf^2$ group which relate to the $Rf^1$ group of the constituent (A) are essential conditions which must be satisfied in order to achieve a low bleeding cured product from a composition of the present invention.

Specific examples of the polyfluoromonoalkenyl compound represented by the general formula (2) described above include the compounds shown below (wherein in the following formulas, m is a value which satisfies the conditions described above).

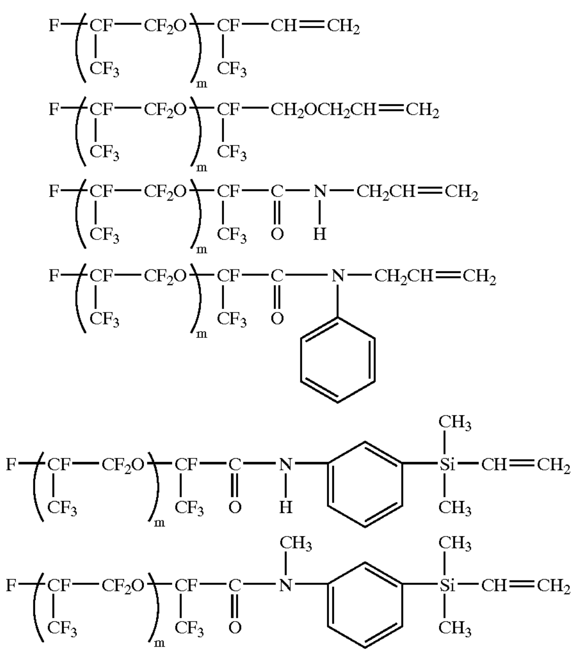

The amount of the constituent (B) incorporated within a composition of the present invention is from 1 to 300 parts by weight, and preferably from 50 to 250 parts by weight per 100 parts by weight of the aforementioned constituent (A).

Furthermore, in a similar manner to the constituent (A), the viscosity (23° C.) of the constituent (B) should preferably be within a range from 5 to 100,000 mPa·s.

[Constituent (C)]

An organohydrogensiloxane compound of the constituent (C) of the present invention must have at least two hydrogen atoms bonded to silicon atoms within each molecule.

The constituent (C) of the present invention functions as a cross linking agent and a chain extender for the constituent (A) and the constituent (B), and from the viewpoints of producing good co-solubility with the constituents (A) and (B), good dispersibility and good uniformity following curing, the constituent (C) should preferably also incorporate at least one fluorine-containing group within each molecule.

Examples of this fluorine-containing group include groups represented by the general formulas shown below:

$$C_mF_{2m+1}{-}$$

wherein, m represents an integer from 1 to 20, and preferably from 2 to 10;

$$F{-}[CF(CF_3)CF_2O]_n{-}CF(CF_3){-}$$

wherein, n represents an integer from 2 to 200, and preferably from 2 to 100;

$${-}C_mF_{2m}{-}$$

wherein, m represents an integer from 1 to 20, and preferably from 2 to 10; and $${-}CF(CF_3){-}[OCF_2CF(CF_3)]_m{-}O{-}CF_2CF_2{-}O{-}[CF(CF_3)CF_2O]_n{-}CF(CF_3){-}$$

wherein, m and n represent integers of 1 or greater, although the average value of m+n=2 to 200, and preferably 2 to 100.

Specific examples of the constituent (C) with these types of fluorine-containing groups include the compounds shown below. These compounds may be used singularly, or in combinations of two or more compounds. In the following formulas, Me represents a methyl group and Ph represents a phenyl group.

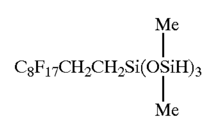

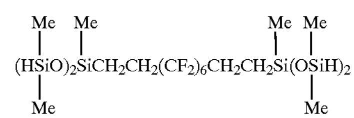

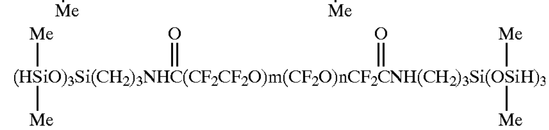

wherein, m=10 and n=6;

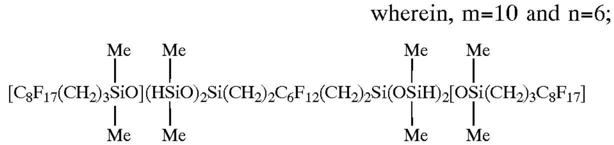

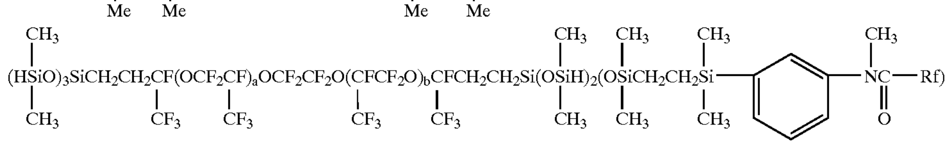

wherein, Rf is a group represented by a formula shown below, with n=24,
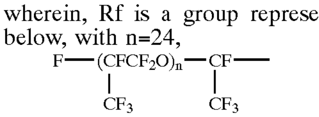
a and b each represent integers of 1 or 2, and the average value of a+b is 3;
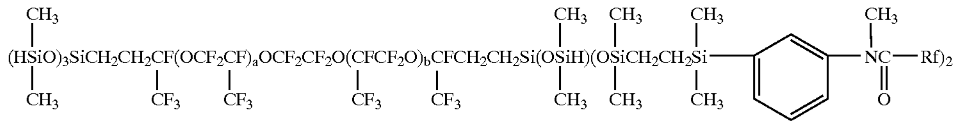
wherein, Rf is a group represented by a formula shown below, with n=50,
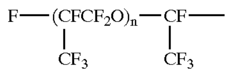
and a+b=2;
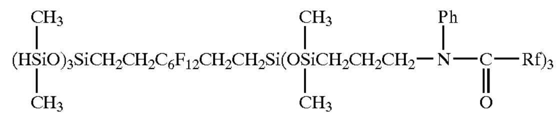
wherein, Rf is a group represented by a formula shown below, with n=30;
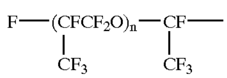
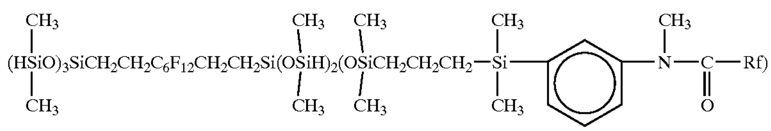
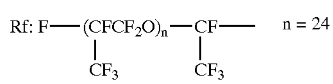
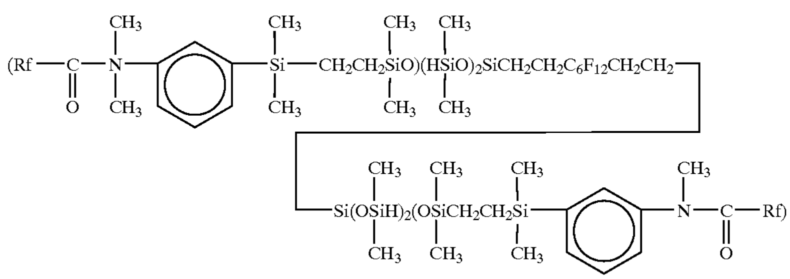
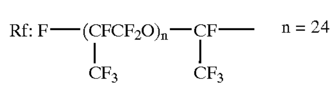
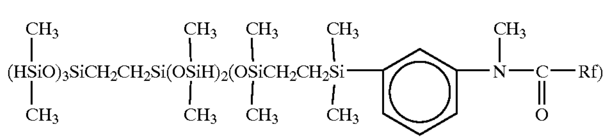
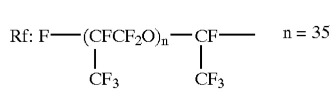

-continued
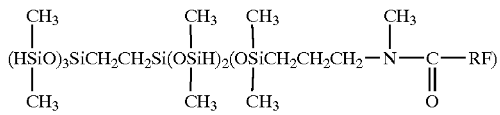
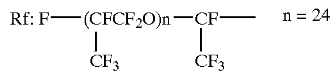
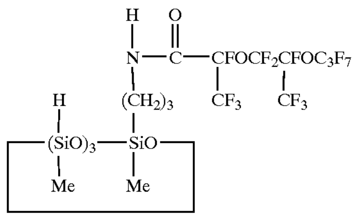
,
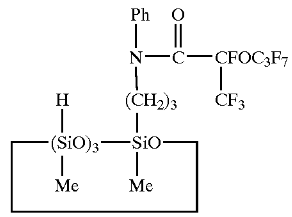
,
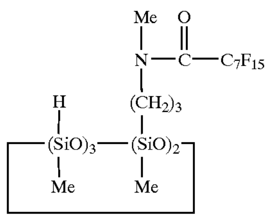
,
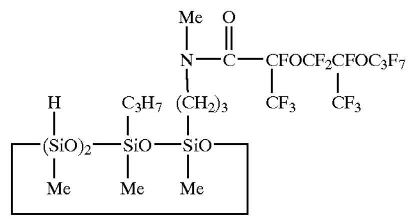
,
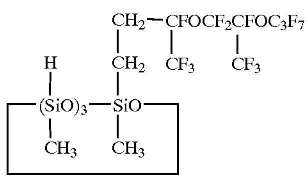
,
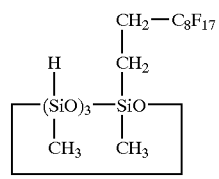
,
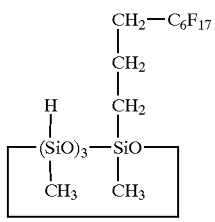
,
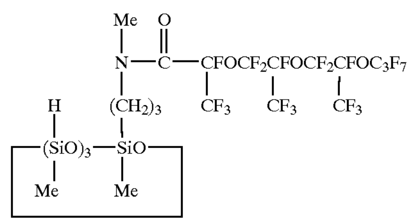
,
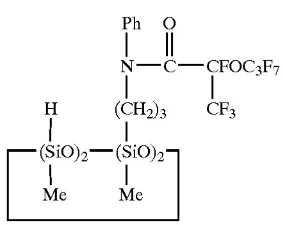
,
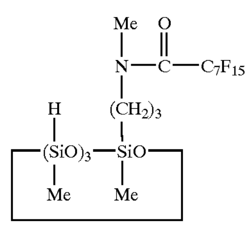
,
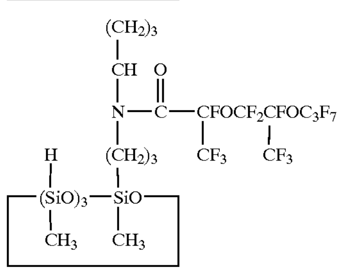
,
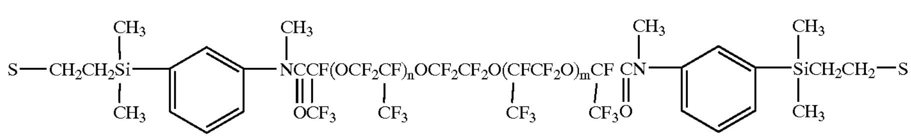

-continued
wherein S: 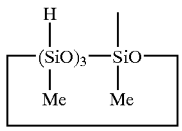 ,
n is an integer from 1 to 50, and m is an integer from 1 to 50, although the average value of n+m=2 to 50;
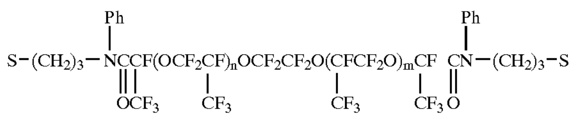
-continued
wherein S: 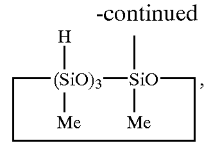 ,
n is an integer from 1 to 50, and m is an integer from 1 to 50, although the average value of n+m=2 to 50;
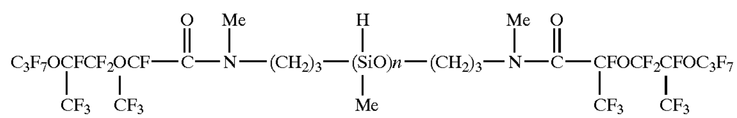
wherein, n is an integer from 3 to 50;
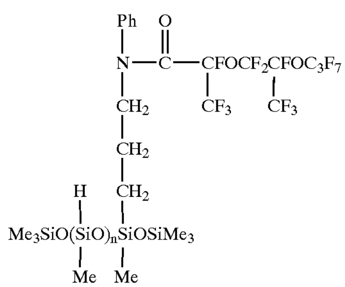
n = 3~50
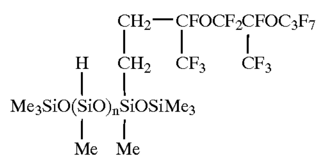
n = 3~50
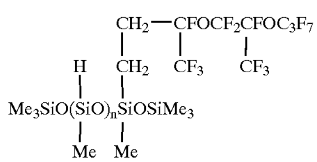
n = 3~50
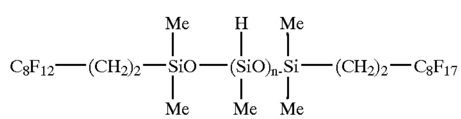
n = 3~50
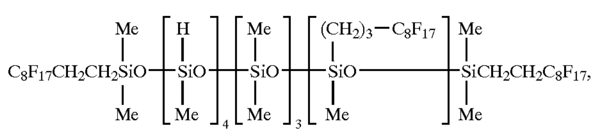
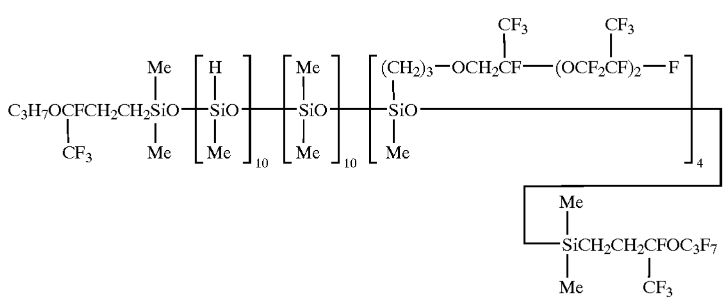
, -continued

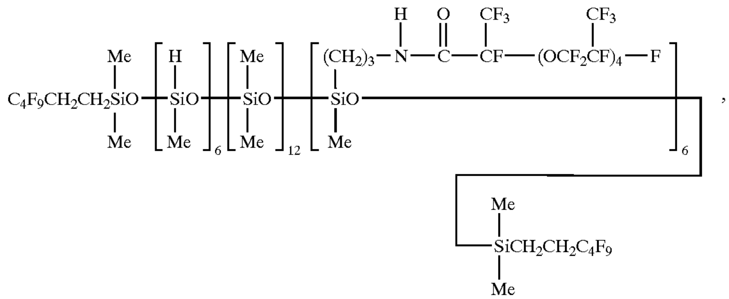

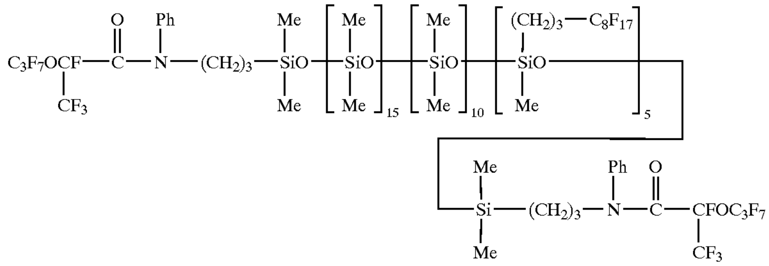

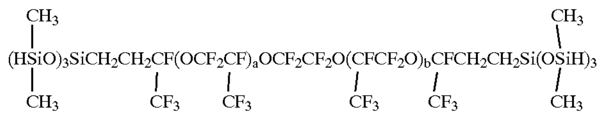

wherein, a is an integer from 1 to 50, and b is an integer from 1 to 50, although the average value of a+b=2 to 50.

The quantity of the constituent (C) incorporated within a composition of the present invention should be sufficient to generate from 0.2 to 2 mols, and preferably from 0.5 to 1.3 mols of hydrosilyl groups (Si—H) within the constituent (C), per 1 mol of the combined quantity of alkenyl groups within the constituent (A) and the constituent (B). If the number of hydrosilyl groups (Si—H) is too small, then the degree of cross-linking may be insufficient, making it impossible to obtain a gel type cured product, whereas if the number is too large, foaming may occur during curing.

[Constituent (D)]

A platinum group metal catalyst of the constituent (D) of the present invention is a catalyst for promoting an addition reaction between the alkenyl groups within the constituent (A) and the constituent (B), and the hydrosilyl groups within the constituent (C). Because of their comparatively good availability, platinum compounds are widely used as the platinum group metal catalyst. Examples of suitable platinum compounds include chloroplatinic acid; complexes of chloroplatinic acid with olefins such as ethylene, alcohols or vinylsiloxanes; and metallic platinum supported on silica, alumina or carbon and the like. Examples of suitable platinum group metal catalysts other than platinum compounds include compounds of rhodium, ruthenium, iridium and palladium, such as $RhCl(PPh_3)_3$, $RhCl(CO)(PPh_3)_2$, $Ru_3(CO)_{12}$, $IrCl(CO)(PPh_3)_2$, and $Pd(PPh_3)_4$ (wherein, Ph represents a phenyl group).

The quantity of the constituent (D) used need only be an effective quantity, and a preferred quantity is within a range from 0.1 to 100 ppm (of the platinum group metal) on weight basis of the combination of the constituents (A), (B) and (C).

[Constituent (E)]

The straight chain or branched polyfluoro compound of a constituent (E) of the present invention is an optional constituent, although by including this constituent, the composition can be easily adjusted to the desired gel type without any deterioration in the physical properties of the composition.

Suitable examples of the constituent (E) include polyfluoro compounds selected from a group consisting of compounds represented by general formulas (3) to (5) shown below.

$$A\text{-}O\text{—}(CF_2CF_2CF_2O)_c\text{-}A \qquad (3)$$

wherein, each group A represents, independently, a group represented by $CF_3$—, $C_2F_5$— or $C_3F_7$—, and c represents an integer from 1 to 200, which is smaller than the sum of r and the average value of p+q, smaller than the sum of r and the average value of s+t, and smaller than the sum of u and v, according to the definitions for the group $Rf^1$ of the aforementioned constituent (A).

$$A\text{-}O\text{—}(CF_2O)_d(CF_2CF_2O)_e\text{-}A \qquad (4)$$

wherein, A is as defined above, d and e each represent an integer from 1 to 200, and the sum of d and e is smaller than the sum of r and the average value of p+q, smaller than the sum of r and the average value of s+t, and smaller than the sum of u and v, according to the definitions for the group $Rf^1$ of the aforementioned constituent (A).

$$A\text{-}O\text{—}(CF_2O)_d[CF_2CF(CF_3)O]_f\text{-}A \qquad (5)$$

wherein, A is as defined above, d and f each represent an integer from 1 to 200, and the sum of d and f is smaller than the sum of r and the average value of p+q in the general formula (i), smaller than the sum of r and the average value of s+t in the general formula (ii), and smaller than the sum of u and v in the general formula (iii), according to the definitions for the group $Rf^1$ of the aforementioned constituent (A).

The restrictions on the values of c through f which relate to the $Rf^1$ group of the constituent (A) are essential conditions which must be satisfied in order to achieve a low bleeding cured product from a composition of the present invention.

Specific examples of the constituent (E) include the compounds shown below (wherein in the following formulas, the value of n, and the sum of n and m satisfy the conditions described above).

$$CF_3O—(CF_2CF_2CF_2O)_n—CF_2CF_3$$

$$CF_3—[(OCF_2CF_2)_n(OCF_2)_m]—O—CF_3$$

$$CF_3—[(OCF(CF_3)CF_2)_n(OCF_2)_m]—O—CF_3$$

When a constituent (E) is included in a composition of the present invention, the quantity of the constituent (E) should be within a range from 1 to 200 parts by weight per 100 parts by weight of the combination of the aforementioned constituents (A) through (D), which represents a quantity which will not impair the characteristics of the cured product. In cases in which a constituent (E) is used, either a single compound or a combination of two or more compounds may be used.

[Other Constituents]

In addition to the constituents (A) through (E) described above, a composition of the present invention may also contain a variety of other additives. Examples of hydrosilylation reaction retarding agents include acetylene alcohols such as 1-ethynyl-1-hydroxycyclohexane, 3-methyl-1-butyn-3-ol, 3,5-dimethyl-1-hexyn-3-ol, 3-methyl-1-pentin-3-ol and phenylbutynol; 3-methyl-3-penten-1-yne, and 3,5-dimethyl-3-hexen-1-yne, or alternatively polymethylvinylsiloxane cyclic compounds and organophosphorus compounds, and the addition of these types of compounds enables the curing reactivity and the storage stability to be maintained at a suitable level. Examples of inorganic fillers include iron oxide, zinc oxide, titanium oxide, calcium carbonate, magnesium carbonate, zinc carbonate and carbon black, and the addition of such fillers enables the hardness and the mechanical strength of the gel type cured product produced from the composition of the present invention to be controlled. Hollow inorganic fillers and rubber-like spherical fillers may also be added. The quantity of these types of additives is arbitrary, provided addition of the additive does not impair the characteristics of the gel composition or the physical characteristics of the cured product.

[Gel Type Cured Product]

By curing a composition of the present invention comprising each of the constituents described above, a gel type cured product with excellent solvent resistance and chemical resistance can be formed.

In the present invention, a gel type cured product refers to a product with a partial three dimensional network structure which undergoes deformation and displays fluidity when placed under stress, and has a penetration, as measured according to ASTM D-1403 (1/4 cone), of 1 to 200.

Formation of this type of gel type cured product is achieved by conventional methods, such as injecting a composition of the present invention into a suitable mold for curing, or coating a suitable substrate with a composition of the present invention and then performing curing. The curing process can be easily achieved by heating, typically at a temperature of 60 to 150° C. for a period of 30 to 180 minutes.

[Electrical and Electronic Components]

Examples of suitable electrical and electronic components which can be sealed or encapsulated with a cured product of a composition of the present invention include pressure sensors such as gas pressure sensors and water pressure sensors, other sensors such as temperature sensors, rotation sensors and timing sensors, as well as air flow meters and various control units.

EXAMPLES

As follows is a more specific description of the present invention using a series of examples and comparative examples. However, the present invention is in no way limited to the examples presented.

Example 1

To a mixture of 40 parts by weight of a polymer (viscosity 2100 cSt) represented by a formula (6) shown below and 60 parts by weight of a polymer (viscosity 650 cSt) represented by a formula (7) shown below were added 0.15 parts by weight of a 50% toluene solution of ethynylcyclohexanol, 0.015 parts by weight of an ethanol solution of a vinylsiloxane complex of chloroplatinic acid (platinum metal concentration 3.0% by weight), and 15 parts by weight of a compound represented by a formula (8) shown below, and the resulting mixture was stirred well to yield a composition of the present invention.

This composition was then heated for 1 hour at 150° C. to form a gel type product. The penetration of this gel was then measured (ASTM D-1403, 1/4 cone). The results are shown in Table 1.

(6)

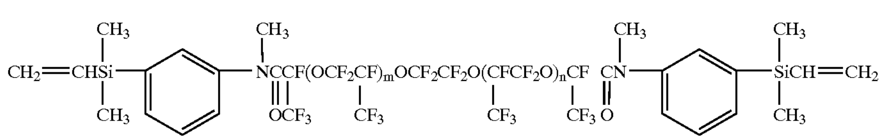

wherein, the average value of m+n=33.

(7)

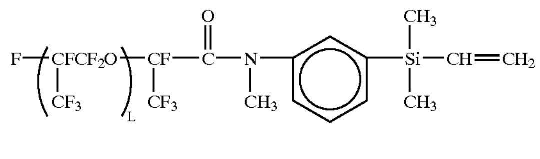

wherein, L = 24.

-continued (8)

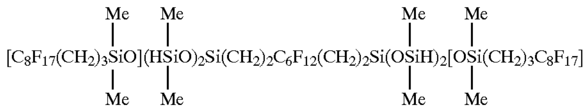

Example 2

With the exceptions of replacing the polymer of the formula (6) from the example 1 with 35 parts by weight of a polymer (viscosity 5600 cSt) represented by a formula (9) shown below, reducing the quantity of the polymer of the formula (7) from 60 parts by weight to 40 parts by weight, adding an additional 25 parts by weight of a polymer represented by a formula (10) shown below, and replacing the compound of the formula (8) with 25 parts by weight of a compound represented by a formula (11) shown below, a composition was prepared in a similar manner to the example 1, and a gel type product then produced. The penetration value for the gel is shown in Table 1.

(9)

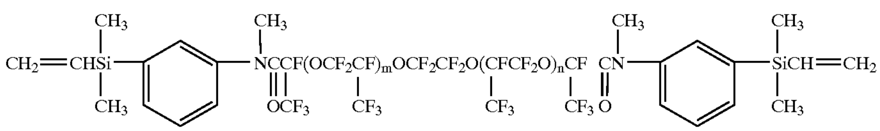

wherein, the average value of m+n=98.

$$CF_3O—(CF_2CF_2CF_2O)e\text{-}C_2F_5 \quad (10)$$

wherein, e=27.

(11)

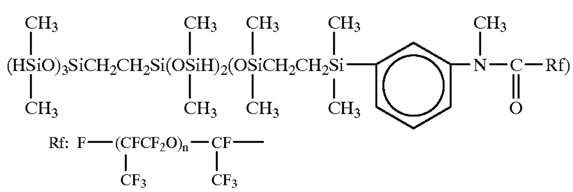

wherein, n=35.

Comparative Example 1

With the exceptions of replacing the polymer of the formula (7) from the example 1 with 60 parts by weight of a polymer represented by a formula (12) shown below, and reducing the quantity of the compound of the formula (8) from 15 parts by weight to 12 parts by weight, a composition and a gel were prepared in a similar manner to the example 1. The penetration of the gel, measured in the same manner as for the example 1, is shown in Table 1.

(12)

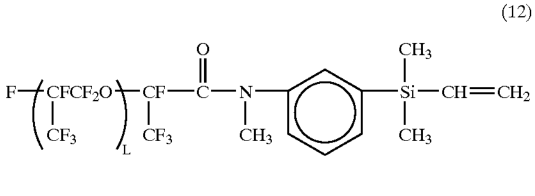

wherein, L=50.

Comparative Example 2

With the exception of including an additional 25 parts by weight of a polymer represented by a formula (13) shown below, a composition and a gel were prepared in a similar manner to the example 2. The penetration of the gel, measured in the same manner as for the example 2, is shown in Table 1.

$$C_2F_5O—(CF_2O)_c(CF_2CF_2O)_d—CF_3 \quad (13)$$

wherein, c=60, and d=140.

[Bleed Tests]

The compositions from the examples 1 and 2 and the comparative examples were each cured inside a vessel of internal dimensions 49 mm in diameter and 10 mm in depth using the same curing method as that described for the example 1. The cured product was then removed from the vessel and placed on a pile of 5 pieces of filter paper (125 mm in diameter), and a 500 g weight was then placed on top of the cured product.

Each sample was then left in this state for 1000 hours at 23° C., and the increase in weight of the pieces of filter paper, excluding the piece directly contacting the sample, was measured. This value was recorded as the bleed quantity. The results are shown in Table 1.

TABLE 1

| | Example 1 | Example 2 | Comparative Example 1 | Comparative Example 2 |
|---|---|---|---|---|
| Penetration | 74 | 72 | 68 | 76 |
| Bleed Quantity (g) | 0 | 0 | 0.05 | 0.12 |

A curable composition of the present invention uses constituents (constituent A and constituent B) with alkenyl group-containing perfluoropolyether structures within the main chain as base polymers, and as a result a gel type cured product obtained by curing the composition displays excellent chemical resistance and solvent resistance, and also displays very little bleeding.

What is claimed is:

1. A curable composition comprising:

(A) a branched polyfluorodialkenyl compound of one of the formulae below:

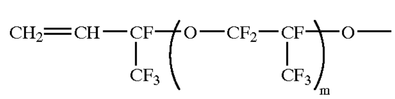

-continued

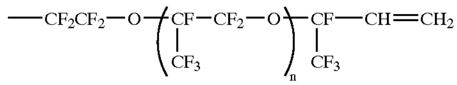

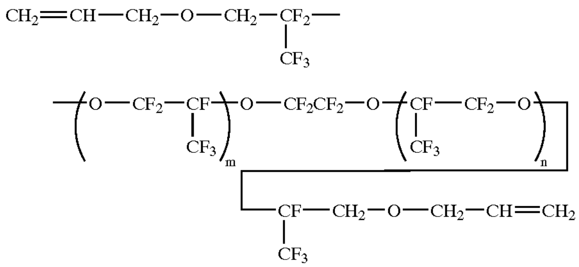

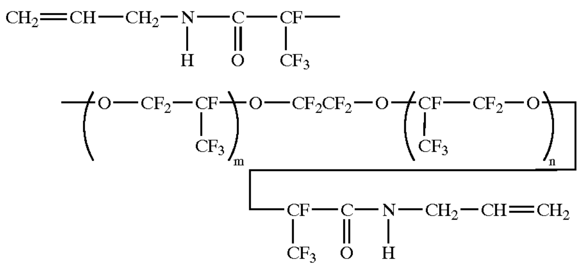

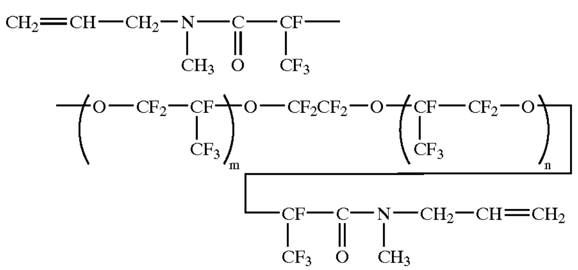

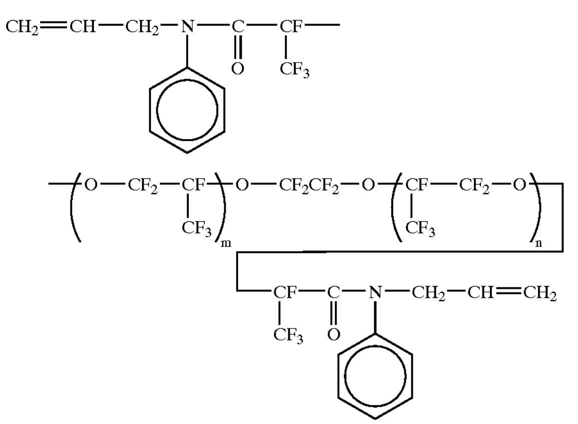

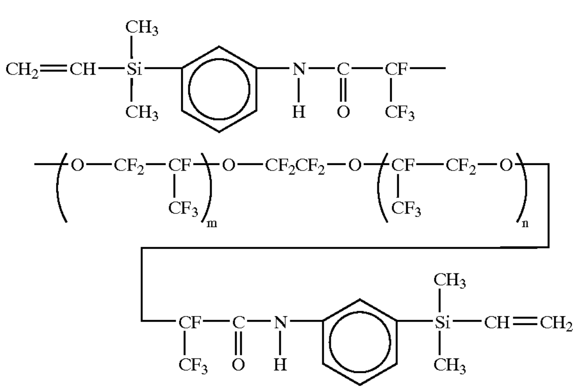

-continued

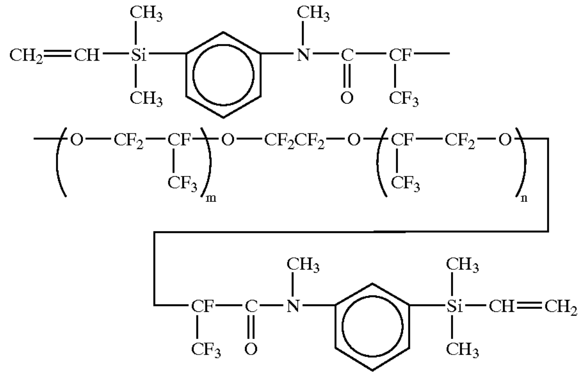

wherein m and n are, each independently, integers of 1 or greater, with an average value of m+n=2 to 200;

(B) a branched polyfluoromonoalkenyl compound of formula (2):

$$Rf^2\text{-}(X')_a\text{—}CH\text{=}CH_2 \qquad (2)$$

wherein

X' is —$CH_2$—, —$OCH_2$—, —$CH_2OCH_2$— or —CO—$NR^1$—Y'—,

Y' is —$CH_2$— or

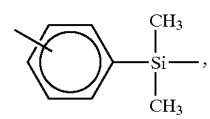

$R^1$ is hydrogen or a substituted or unsubstituted monovalent hydrocarbon group, a is 0 or 1, and $Rf^2$ is a group of formula (iv) or (v):

$$F\text{—}[CF(CF_3)CF_2O]_w\text{—}CF(CF_3)\text{—} \qquad (iv)$$

wherein w is an integer of 1 or greater that is smaller than the average value of m+n based on (A), or $$F\text{—}[CF(CF_3)CF_2O]_x\text{—}CF(CF_3)CF_2OCF_2CF_2\text{—} \qquad (v)$$

wherein x is an integer of 1 or greater that is smaller than the average value of m+n based on (A;

(C) an organohydrogensiloxane compound with at least two hydrogen atoms bonded to silicon atoms within a single molecule; and (D) an effective quantity of a platinum group metal catalyst.

2. The composition according to claim 1, wherein the polyfluoromonoalkenyl compound of (B) is a compound of one of formulas shown below:

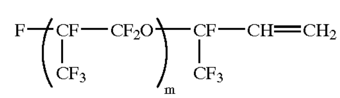

-continued

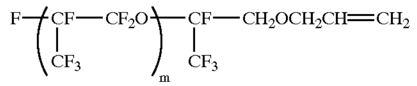

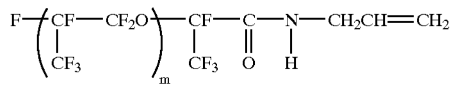

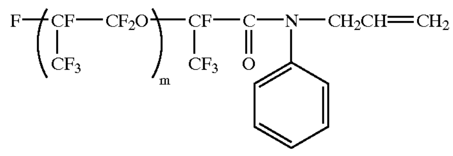

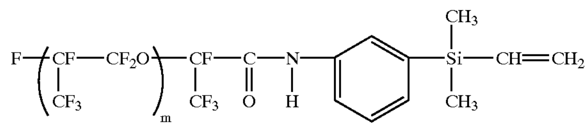

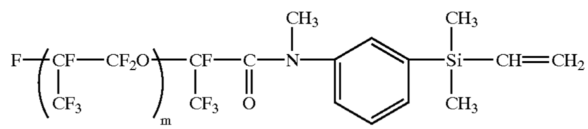

wherein m is an integer of 1 or greater.

3. The composition according to claim 1, wherein the organohydrogensiloxane of (C) comprises a fluorine-containing group.

4. The composition according to claim 3, wherein said fluorine-containing group is of the formula $$C_mF_{2m+1}—$$

wherein m is an integer from 1 to 20, the formula $$F—[CF(CF_3)CF_2O]_n—CF(CF_3)—$$

wherein n is an integer from 2 to 200, the formula $$—C_mF_{2m}—$$

wherein m is an integer from 1 to 20, or the formula $$—CF(CF_3)—[OCF_2CF(CF_3)]_m—O—CF_2CF_2—O—[CF(CF_3)CF_2O]_n—CF(CF_3)—$$

wherein m and n are, each independently, integers of 1 or greater, with an average value of m+n=2 to 200.

5. The composition according to claim 1, wherein the quantity of (B) is 1 to 300 parts by weight per 100 parts by weight of (A), and the quantity of (C) is sufficient to generate 0.2 to 2 mols of hydrosilyl groups (Si—H) within (C) per 1 mol of the combined quantity of alkenyl groups within (A) and (B).

6. A low bleeding gel type cured product with a penetration of 1 to 200, obtained by curing a curable composition according to claim 1.

7. An electrical or electronic component encapsulated with a curable composition according to claim 1 or encapsulated with a low bleeding gel type cured product with a penetration of 1 to 200, obtained by curing a curable composition according to claim 3.

8. The electrical or electronic component according to claim 7, wherein said component is a gas pressure sensor, a water pressure sensor, a temperature sensor, a rotation sensor, a timing sensor or an air flow meter.

9. A curable composition comprising:

(A) a branched polyfluorodialkenyl compound of formula (1):

$$CH_2{=}CH—(X)_a\text{-}Rf^1\text{-}(X')_a—CH{=}CH_2 \quad (1)$$

wherein,

X is $—CH_2—$, $—CH_2O—$, $—CH_2OCH_2—$ or $—Y—NR^1—CO—$,

Y is $—CH_2—$ or

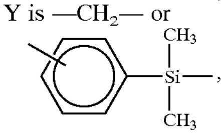

and $R^1$ is hydrogen or a substituted or unsubstituted monovalent hydrocarbon group, X' is $—CH_2—$, $—OCH_2—$, $—CH_2OCH_2—$ or $—CO—NR^1—Y'—$, Y' is $—CH_2—$ or

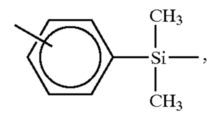

and $R^1$ is as defined above, a is, in each case independently, 0 or 1, and $Rf^1$ is a group of the formula (i), (ii) or (iii):

$$—CF(CF_3)—[OCF_2CF(CF_3)]_p—[O—CF_2(CF_2)_rCF_2—O]—[CF(CF_3)CF_2O]_q—CF(CF_3)— \quad (i)$$

wherein p and q are, each independently, integers of 1 or greater with an average value of p+q=2 to 200, and r is an integer of 0 to 6, $$—CF_2CF_2—[OCF_2CF(CF_3)]_s—[O—CF_2(CF_2)_rCF_2—O]—[CF(CF_3)CF_2O]_t—CF_2CF_2— \quad (ii)$$

wherein s and t are, each independently, integers of 1 or greater with an average value of s+t=2 to 200, and r is as defined above, or $$—CF(CF_3)—[OCF(CF_3)CF_2]_u—(OCF_2)_v—OCF(CF_3)— \quad (iii)$$

wherein u is an integer of 1 to 200, and v is an integer of 1 to 50;

(B) a branched polyfluoromonoalkenyl compound of formula (2):

$$Rf^2\text{-}(X')_a—CH{=}CH_2 \quad (2)$$

wherein

X' and a are as defined above, and $Rf^2$ is a group of the formula (iv) or (v):

$$F—[CF(CF_3)CF_2O]_w—CF(CF_3)— \quad (iv)$$

wherein w is an integer of 1 or greater that is smaller than an average value of m+n of A), or $$F—[CF(CF_3)CF_2O]_x—CF(CF_3)CF_2OCF_2CF_2— \quad (v)$$

wherein x is an integer of 1 or greater that is smaller than an average value of m+n of (A);

(C) an organohydrogensiloxane compound with at least two hydrogen atoms bonded to silicon atoms within a single molecule;

(D) an effective quantity of a platinum group metal catalyst, and (E) at least one straight chain or branched polyfluoro compound selected from one of formulae (3), (4) or (5):

$$A\text{-}O—(CF_2CF_2CF_2O)_c\text{-}A \quad (3)$$

wherein each group A is, independently, $CF_3—$, $C_2F_5—$ or $C_3F_7—$, and c is an integer of 1 to 200 that is smaller than the sum of r and the average value of p+q, smaller than the sum of r and the average value of s+t, and smaller than a sum of u and v, based on $Rf^1$ of (A);

$$A\text{-}O—(CF_2O)_d(CF_2CF_2O)_e\text{-}A \quad (4)$$

wherein A is as defined above, d and e are each independently, an integer of 1 to 200, and the sum of d and f is smaller than the sum of r and the average value of p+q, smaller than the sum of r and the average value of s+t, and smaller than the sum of u and v, based on $Rf^1$ of (A); or $$A\text{-}O—(CF_2O)_d[CF_2CF(CF_3)O]_f\text{-}A \qquad (5)$$

wherein A is as defined above, d and f are, each independently, an integer of 1 to 200, and the sum of d and f is smaller than the sum of r and the average value of p+q, smaller than the sum of r and the average value of s+t, and smaller than the sum of u and v, based on $Rf^1$ of (A).

10. The composition according to claim 9, wherein $Rf^1$ is:

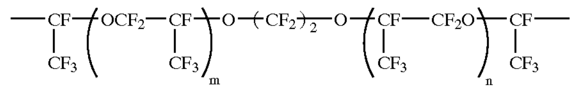

wherein m and n are, each independently, integers of 1 or greater, with an average value of m+n=2 to 200,

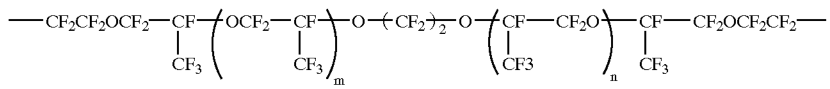

wherein m and n are, each independently, integers of 1 or greater, with an average value of m+n=2 to 200, or

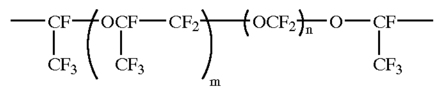

wherein m is an integer of 1 to 200 and n is an integer of 1 to 50.

11. The curable composition according to claim 9, wherein the quantity of (E) is 1 to 200 parts by weight per 100 parts by weight of a combination of (A) through (D).

12. The composition according to claim 9, wherein the polyfluorodialkenyl compound of formula (1) is a compound shown below:

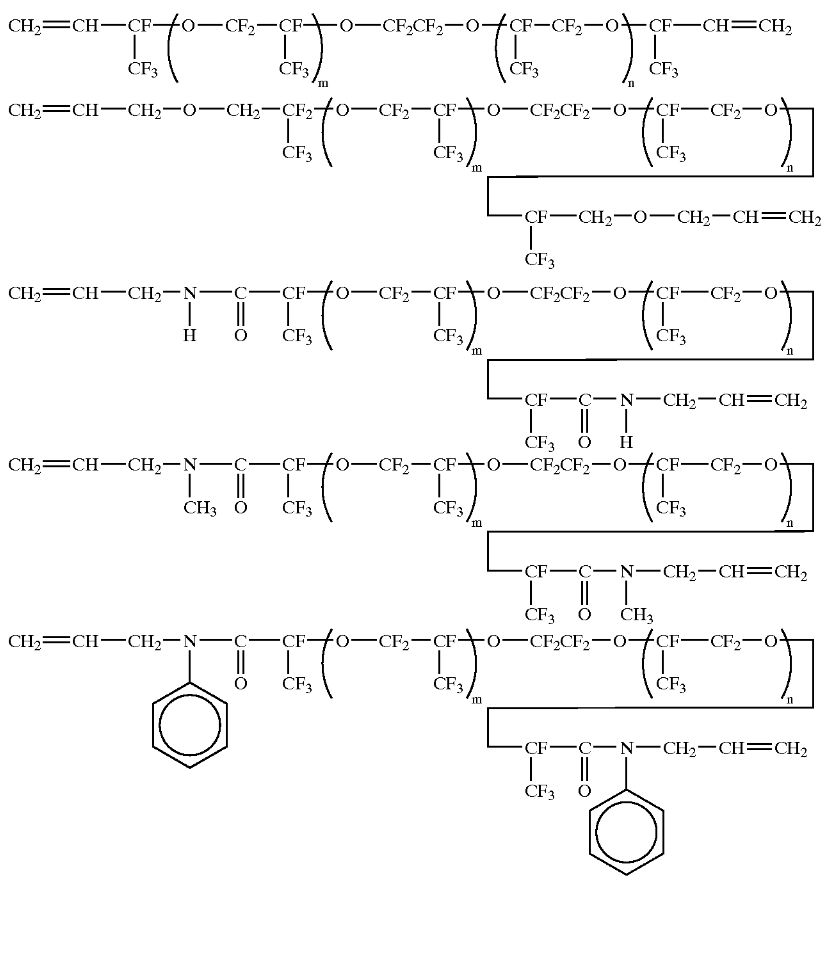

-continued

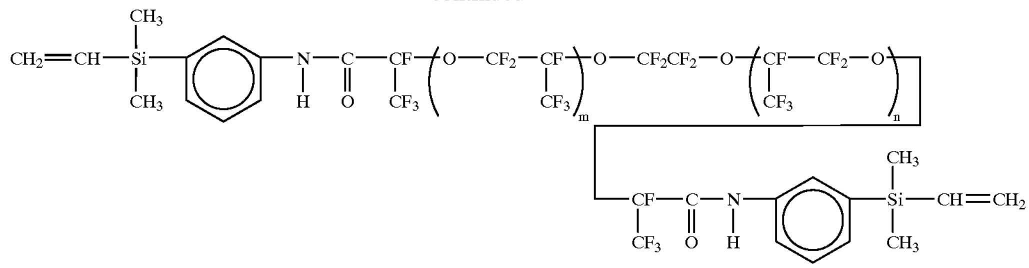

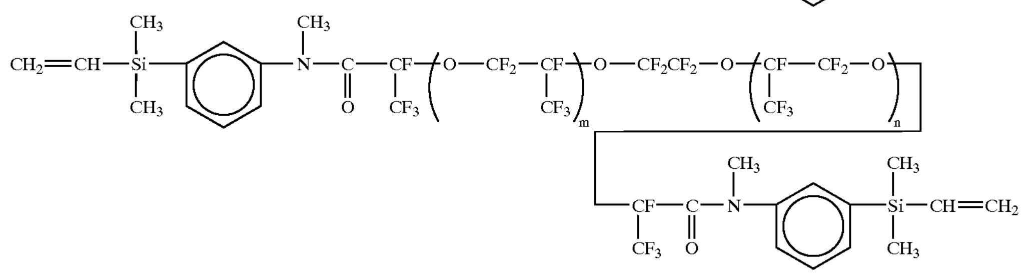

wherein m and n are, each independently, integers of 1 or greater with an average value of m+n=2 to 200.

13. The composition according to claim 9, wherein the polyfluoromonoalkenyl compound of (B) is a compound shown below:

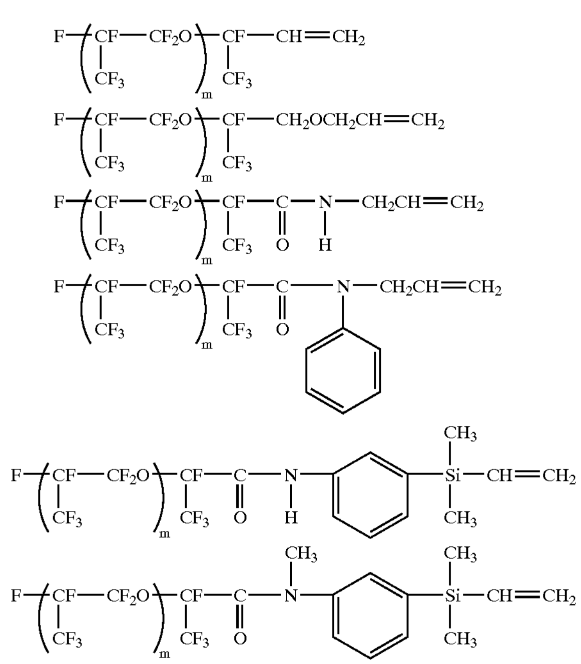

wherein m is an integer of 1 or greater.

14. The composition according to claim 9, wherein the organohydrogensiloxane of (C) comprises a fluorine-containing group.

15. The composition according to claim 14, wherein said fluorine-containing group is of formula $$C_mF_{2m+1}—$$

wherein m is an integer from 1 to 20, $$F—[CF(CF_3)CF_2O]_n—CF(CF_3)—$$

wherein n is an integer from 2 to 200, $$—C_mF_{2m}—$$

wherein m is an integer from 1 to 20, or $$—CF(CF_3)—[OCF_2CF(CF_3)]_m—O—CF_2CF_2—O—[CF(CF_3)CF_2O]_n—CF(CF_3)—$$

wherein m and n are, each independently, integers of 1 or greater with an average value of m+n=2 to 200.

16. The composition according to claim 9, wherein the quantity of (B) is 1 to 300 parts by weight per 100 parts by weight of (A), and the quantity of (C) is sufficient to generate 0.2 to 2 mols of hydrosilyl groups (Si—H) within (C) per 1 mol of a combined quantity of alkenyl groups within (A) and (B).

17. A low bleeding gel type cured product with a penetration of 1 to 200, obtained by curing a curable composition according to claim 9.

18. An electrical or electronic component encapsulated with a curable composition according to claim 8 or encapsulated with a low bleeding gel type cured product with a penetration of 1 to 200, obtained by curing a curable composition according to claim 9.

19. The electrical or electronic component according to claim 18, wherein said component is a gas pressure sensor, a water pressure sensor, a temperature sensor, a rotation sensor, a timing sensor or an air flow meter.

* * * * *